(12) United States Patent
Wang et al.

(10) Patent No.: US 12,510,058 B2
(45) Date of Patent: Dec. 30, 2025

(54) COOLING SYSTEM AND WIND POWER GENERATOR SET

(71) Applicant: XINJIANG GOLDWIND SCIENCE & TECHNOLOGY CO., LTD., Xinjiang (CN)

(72) Inventors: Dinghui Wang, Beijing (CN); Junwei Liu, Beijing (CN); Si Gao, Beijing (CN)

(73) Assignee: XINJIANG GOLDWIND SCIENCE & TECHNOLOGY CO., LTD., Xinjiang (CN)

( * ) Notice: Subject to any disclaimer, the term of this patent is extended or adjusted under 35 U.S.C. 154(b) by 355 days.

(21) Appl. No.: 17/997,676

(22) PCT Filed: Sep. 8, 2020

(86) PCT No.: PCT/CN2020/113947
§ 371 (c)(1),
(2) Date: Nov. 1, 2022

(87) PCT Pub. No.: WO2021/248715
PCT Pub. Date: Dec. 16, 2021

(65) Prior Publication Data
US 2023/0349365 A1    Nov. 2, 2023

(30) Foreign Application Priority Data
Jun. 9, 2020   (CN) .......................... 202010516571.6

(51) Int. Cl.
*F03D 80/60* (2016.01)
*H02K 7/18* (2006.01)
*H02K 9/193* (2006.01)

(52) U.S. Cl.
CPC ............ *F03D 80/60* (2016.05); *H02K 7/1838* (2013.01); *H02K 9/193* (2013.01); *F05B 2260/20* (2013.01)

(58) Field of Classification Search
CPC ......... F03D 80/60; F03D 80/602; H02K 9/12; F05B 2240/14; F05B 2260/20;
(Continued)

(56) References Cited

U.S. PATENT DOCUMENTS 7,168,251 B1 *   1/2007   Janssen ................... F03D 80/60
                                                                    60/641.1
8,052,383 B2 *   11/2011  Frokjaer ................. F03D 80/60
                                                                    415/178
(Continued)

FOREIGN PATENT DOCUMENTS

CL   202203356   11/2022
CL   202203357   11/2022
(Continued)

OTHER PUBLICATIONS

The International Search Report mailed Mar. 12, 2021; PCT/CN2020/113947.
(Continued)

*Primary Examiner* — Jianying C Atkisson
*Assistant Examiner* — For K Ling

(57) ABSTRACT

The cooling system comprises a first cooling circuit for cooling a first heating component, a second cooling circuit for cooling a second heating component, a third cooling circuit for cooling a third heating component, a fourth cooling circuit for cooling a fourth heating component, a pump station unit, and a heat dissipation unit; the pump station unit comprises a pump group, a water separator, and a water collector, a water supply main is between the pump group and the water separator, and a water return main is
(Continued)

between the pump group and the water collector; the pump group provides a cooling medium for the first, second, third and fourth cooling circuits via the water separator; the first cooling circuit is directly communicated with the water separator and the water collector; and the second, third and fourth cooling circuits are communicated with the water collector via the heat dissipation unit respectively.

20 Claims, 5 Drawing Sheets

(58) Field of Classification Search
CPC .......... F05B 2260/205; F05B 2260/207; F05B 2260/221; F05B 2260/222; F05B 2260/224; F05B 2260/2241; H05K 7/20927; H05K 7/20703
See application file for complete search history.

(56) References Cited

U.S. PATENT DOCUMENTS

| | | | | |
|---|---|---|---|---|
| 8,601,804 | B2 * | 12/2013 | Akashi | F03D 80/60 60/494 |
| 9,127,648 | B2 * | 9/2015 | Sabhapathy | F03D 80/80 |
| 2008/0307817 | A1 * | 12/2008 | Roesner | F28D 15/00 165/104.19 |
| 2010/0150704 | A1 * | 6/2010 | Grevsen | F03D 80/60 415/177 |
| 2011/0095539 | A1 * | 4/2011 | Tietze | F03D 80/88 165/104.31 |
| 2012/0009066 | A1 * | 1/2012 | Vilbrandt | F03D 17/00 416/153 |
| 2012/0133152 | A1 * | 5/2012 | Wagoner | F03D 80/82 290/1 B |
| 2012/0235419 | A1 * | 9/2012 | Huang | F03D 80/60 290/55 |
| 2012/0257970 | A1 * | 10/2012 | Akashi | F03D 80/70 416/95 |
| 2013/0025818 | A1 * | 1/2013 | Lyon | H05K 7/20781 165/181 |
| 2013/0056989 | A1 | 3/2013 | Sabhapathy | |
| 2013/0071236 | A1 * | 3/2013 | Sabhapathy | F03D 80/88 415/180 |
| 2013/0236308 | A1 * | 9/2013 | Tietze | F03D 7/026 416/1 |
| 2013/0319631 | A1 | 12/2013 | Sabhapathy et al. | |
| 2015/0233265 | A1 * | 8/2015 | Rohden | F03D 80/88 415/177 |
| 2020/0011303 | A1 * | 1/2020 | Airoldi | F25B 25/005 |

FOREIGN PATENT DOCUMENTS

| | | | | |
|---|---|---|---|---|
| CN | 100523493 | C | | 8/2009 |
| CN | 201957389 | U | | 8/2011 |
| CN | 202215442 | U | | 5/2012 |
| CN | 102158014 | B | | 10/2012 |
| CN | 103531863 | A | | 1/2014 |
| CN | 103696910 | A | | 4/2014 |
| CN | 101761453 | B | | 8/2014 |
| CN | 204179833 | U | | 2/2015 |
| CN | 104457394 | A | | 3/2015 |
| CN | 102192107 | B | | 7/2015 |
| CN | 103061993 | B | | 9/2015 |
| CN | 104956075 | A | | 9/2015 |
| CN | 205876628 | U | | 1/2017 |
| CN | 106939877 | A * | 7/2017 | |
| CN | 206707945 | U | | 12/2017 |
| CN | 206785568 | U | | 12/2017 |
| CN | 107542629 | A | | 1/2018 |
| CN | 108518319 | A * | 9/2018 | ............. F03D 13/25 |
| CN | 108955081 | A | | 12/2018 |
| CN | 109026557 | A * | 12/2018 | ............. F03D 17/00 |
| CN | 109441740 | A * | 3/2019 | ............. F03D 80/60 |
| CN | 110671282 | A | | 1/2020 |
| CN | 110725779 | A | | 1/2020 |
| EP | 2578879 | A1 * | 4/2013 | ............. F03D 80/00 |
| EP | 2 803 855 | A1 | | 11/2014 |

OTHER PUBLICATIONS

First Office Action from Chilean Patent Office dated May 31, 2023; Appln. No. 202203278.
First Office Action from Chinese Patent Office dated Aug. 24, 2023; Appln. No. 202010516571.6.
The Extended European Search Report dated Aug. 28, 2023; Appln. No. 20939641.5.
The First Indian Office Action dated Jun. 2, 2023; Appln. No. 202217062594.
Indian Patent Office Hearing Notice dated Feb. 5, 2024; Appln. No. 202217062594.
Australian Examination Report No. 1 dated Jan. 18, 2024; Appln. No. 2020452191.
Second Chinese Office Action dated Mar. 8, 2024; Appln. 202010516571.6 Concise Explanation of Relevance.

* cited by examiner

COOLING SYSTEM AND WIND POWER GENERATOR SET

CROSS REFERENCE

The present disclosure is a National Stage of International Application No. PCT/CN2020/113947, filed on Sep. 8, 2020, claims priority to Chinese patent application No. 202010516571.6 filed on Jun. 9, 2020, titled "Cooling System and Wind Power Generator Set", both of which are hereby incorporated in their entireties.

TECHNICAL FIELD

The present disclosure relates to the technical field of wind power generation, and in particular, to a cooling system and a wind power generator set.

BACKGROUND

In recent years, a wind power generator set has gradually developed towards high power density, a loss of the set itself has increased accordingly, and the number of components that need to be cooled has also increased. A generators, a shaft system, a pitch, a nacelle cabinet, a nacelle, a converter cabinet, a transformer and other heating components need to undergo necessary heat dissipation and cooling treatment to achieve a normal operation of each heating component. Especially for an offshore wind power generator set, components are arranged in an E-TOP structure of the nacelle, resulting in more and more complex arrangement and layout of the overall cooling system of the set in the nacelle. Therefore, it is necessary to design a more compact cooling system structural layout research direction in a limited space of the nacelle.

SUMMARY

An object of the present disclosure is to provide a cooling system and a wind power generator set. The cooling system can control multiple cooling circuits is in a centralized manner, simplifying a line configuration and reducing the number of heat dissipation components.

In an aspect, the present disclosure provides a cooling system, comprising: a first cooling circuit for cooling a first heating component, a second cooling circuit for cooling a second heating component, a third cooling circuit for cooling a third heating component, a fourth cooling circuit for cooling a fourth heating component, a pump station unit and a heat dissipation unit; wherein the pump station unit comprises a pump group, a water distributor and a water collector, a main water supply pipe is arranged between the pump group and the water distributor, and a main water return pipe is arranged between the pump group and the water collector; the pump group provides cooling medium for the first cooling circuit, the second cooling circuit, the third cooling circuit and the fourth cooling circuit via the water distributor; the first cooling circuit is directly communicated with the water distributor and the water collector, and the second cooling circuit, the third cooling circuit, and the fourth cooling circuit are respectively connected to the water collector via the heat dissipation unit.

In another aspect, the present disclosure provides a wind power generator set, comprising: a first heating component, comprising at least one of a shaft system, a cable, a nacelle, a pitch mechanism, a nacelle cabinet, and a nacelle base; a second heating component, comprising a converter; a third heating component, comprising a generator; a fourth heating component, comprising a transformer; and the above-mentioned cooling system.

The cooling system provided by the present disclosure integrates the first cooling circuit, the second cooling circuit, the third cooling circuit and the fourth cooling circuit corresponding to respective heating components into one system, and the pump station unit is used as a core power unit of the entire cooling system powers to provide the power for the entire cooling system. As a cooling load undertaken by the first cooling circuit is small, its inlet and outlet are respectively directly connected to the pump station unit through a short circuit, which simplifies a line layout without causing a great impact on a rise of a temperature of the cooling medium in the entire system. Large losses appear in the second cooling circuit, the third cooling circuit, and the fourth cooling circuit. The temperature of the cooling medium pumped from the pump station unit rises after passing through the above three cooling circuits, then enters the heat dissipation unit via which the temperature of the cooling medium drops, and enters the pump station unit again to form a closed-circuit cycle, simplifying a line configuration, reducing the number of heating components, and improving a utilization rate of the cooling capacity of the system. In addition, a wind turbine generator set provided by the present disclosure adopts the aforementioned cooling system, which can effectively calculate a system loss and a heat transfer direction during the operation of the set, and at the same time, explores a more reasonable selection of components to provide sufficient statistical basis for a subsequent evaluation of the reliability of wind power generator set combined with an ambient temperature.

BRIEF DESCRIPTION OF THE DRAWINGS

The present disclosure can be better understood from the following description of specific embodiments of the present disclosure in conjunction with accompanying drawings. Other features, objects and advantages of the present disclosure will become apparent by the following detailed description of non-limiting embodiments with reference to the accompanying drawings. The same or similar reference numbers refer to the same or similar features.

DESCRIPTION OF REFERENCE NUMBERS

Figure 1:
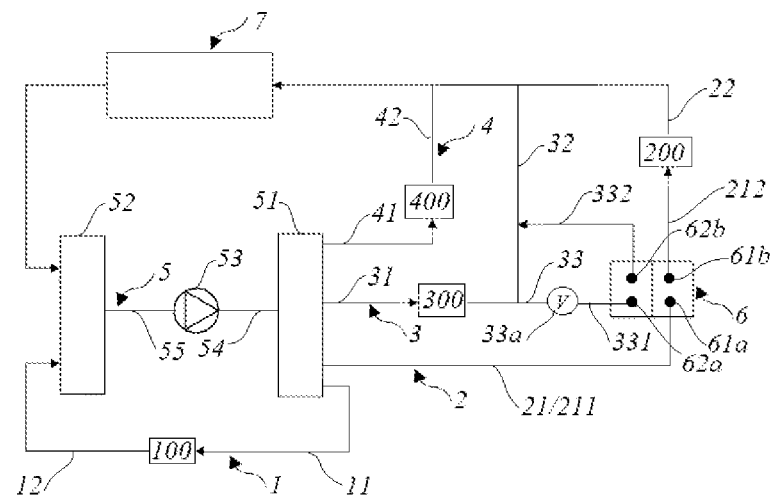
FIG. 1 is a simplified schematic structural diagram of a cooling system for a wind power generator set provided by an embodiment of the present disclosure.

First heating component 100; Second heating component 200; Third heating component 300; First cooling circuit 1; First water supply pipe 11; First fluid branch 13; First water supply pipe 11; First water return pipe 12; First branch radiator 13a; First water return pipe 12; First branch regulating valve VV1; First branch temperature sensor TT1; First branch flow sensor FF1; First valve V1; First drain valve LV1; First pressure monitoring device P1; First exhaust valve AV1; First flexible pipe 14;

Second cooling circuit 2; Second water supply pipe 21; First section 211; Second section 212; Second water return pipe 22; Heater H; Second fluid branch 2121; Second branch radiator 2122; Second branch flow sensor FF2; Second branch temperature sensor TT2; Second middle main temperature sensor T2; Second branch regulating valve VV2; Second valve V2; Second drain valve LV2; Second exhaust valve AV2; Second pressure monitoring device P2; Second flexible pipe 24;

Third cooling circuit 3; Third water supply pipe 31; Third fluid branch 311; Third branch radiator 312; Third water return pipe 32; Bypass 33; Water supply bypass 331; Water return bypass 332; Bypass regulating valve 33a; Third flow sensor F31; Third temperature sensor T31; Third flow sensor F31; Third bypass temperature sensor T32; Third bypass flow sensor F32; Third valve V3; Third drain valve LV3; Third exhaust valve AV3; Two-way shut-off valve DV; Third pressure monitoring device P3; Third flexible pipe 34;

Fourth cooling circuit 4; Fourth water supply pipe 41; Fourth water return pipe 42; Fourth radiator 43; Fourth regulating valve VV4; Fourth temperature sensor TT4; Fourth flow sensor FF4; Fourth valve V4; Fourth drain valve LV4; Fourth exhaust valve AV4; Fourth pressure monitoring device P4; Fourth flexible pipe 44;

Pump station unit 5; Water distributor 51; Water collector 52; Pump group 53; Main water supply pipe 54; Main water return pipe 55; Pump body Pu; Pump body regulating valve PV; Check valve SV; Pressure stabilizing device SP; Pump body exhaust valve AV; Filter Fi; Safety device SF; Main flow sensor FF; Main temperature sensor TT; Main pressure monitoring device P; Main valve V; Drain valve LV;

Heat exchanger 6; First inlet end 61a; First outlet end 61b; second inlet end 62a; second outlet end 62b;

Heat dissipation unit 7; Heat dissipation branch 7a; Fifth radiator 7b; Fifth water supply pipe 71; Fifth water return pipe 72; Fifth valve V5; Fifth drain valve LV5; Fifth exhaust valve AV5; Fifth water supply branch pipe 711; Fifth water return branch pipe 721.

DETAILED DESCRIPTION

Features and exemplary embodiments of various aspects of the present disclosure are described in detail below. Numerous specific details are disclosed in the following detailed description to provide a thorough understanding of the present disclosure. However, it will be apparent to those skilled in the art that the present disclosure may be practiced without some of these specific details. The following description of embodiments is merely to provide a better understanding of the present disclosure by illustrating examples of the present disclosure. The present disclosure is in no way limited to any specific configurations and algorithms set forth below, but covers any modifications, substitutions and improvements of elements, components and algorithms without departing from the spirit of the present disclosure. In the drawings and the following description, well-known structures and techniques have not been shown in order to avoid unnecessarily obscuring the present disclosure.

With a rapid development of wind power generator set, a single-unit capacity of the set is increasing. On the one hand, a loss of the set itself increases, and on the other hand, the number of components that need to be cooled also increases. Especially with a development of a large-capacity offshore set, the E-TOP layout structure (generator, shaft system, pitch system, nacelle cabinet, converter cabinet, transformer and other heating components are all arranged in the nacelle) has an advantage of significantly improving the overall performance relative to environmental factors at sea. But when these heating components are arranged in the nacelle, they all require independent heat dissipation and cooling treatment, and all cooling subsystems are arranged in the nacelle, resulting in more and more components in the nacelle and an increasingly complex layout. In view of different control strategies, processes and layout positions of each heating component, lines of each cooling subsystem are complicated, the number of radiators increases, and the control logic is complicated, which leads to an increase in a failure rate of the system. The overall layout and structure of the cooling subsystem of each heating component are optimized to achieve centralized cooling.

The present disclosure aims to construct a centralized cooling system for a wind power generator set, which is especially suitable for a permanent magnet direct-drive wind power generator set with a high-power offshore E-TOP layout. For the set with no E-TOP layout (that is, the main heating components are not all located in the nacelle), if a length cost and a layout complexity of a line are not considered, the centralized cooling system of the present disclosure can also be used. That is, according to an actual position of respective heating components, the same layout idea can be adopted to lay out respective cooling subsystems, thereby optimizing the layout of the cooling subsystems of the heating components as a whole. For a better understanding of the present disclosure, the cooling system and the wind power generator set according to embodiments of the present disclosure will be described in detail below with reference to FIGS. 1 to 10.

Referring to FIG. 1, an embodiment of the present disclosure provides a wind power generator set, including: a first heating component 100, a second heating component 200, a third heating component 300, a fourth heating component 400, and a cooling system.

The first heating component 100 is a combination of components that generate a relatively less amount of heat, and its heat dissipation loss is also small. The heat-dissipating subsystems of all the heating components can be integrated into one cooling circuit or several cooling branches in an integrated manner, to achieve the heat dissipation requirements of heating components. Optionally, the first heating component 100 may include at least one of a shaft system, a cable, a pitch, a nacelle, a nacelle cabinet, and a nacelle base.

The second heating component 200 is a combination of components that generate a relatively large amount of heat, and its corresponding heat dissipation loss requirements are also relatively high. Optionally, the second heat generating component 200 includes a converter. In addition, the second heating component 200 is generally required to be maintained a minimum temperature, and an increase or decrease of its heat dissipation loss is proportional to the heat dissipation loss of the third heating component 300 (such as a generator), that is, they operate in opposite directions.

The third heating component 300 is a combination of components that generate the largest amount of heat, and its corresponding heat dissipation loss requirement is also the highest. Optionally, the third heating component 300 may include a generator. In addition, the third heating component 300, taking the generator as an example, not only generates a large amount of heat, but also provides the waste heat to other heating components in a low temperature environment, so as to meet the minimum temperature operation requirements of other heating components in a low temperature environment.

The fourth heating component 400 is a combination of components that generate a relatively large amount of heat, and its corresponding heat dissipation loss requirement is also relatively high. Optionally, the fourth heating component 400 includes a transformer. Moreover, the increase or decrease of the heat dissipation loss of the fourth heating component 400 is proportional to the heat dissipation loss of the third heating component 300, taking the generator as an example, that is, they operate in opposite directions.

It should be noted that in the present disclosure, in actual operation and design, according to a specific number of each heating component and different cooling forms and cooling requirements, settings and coupling settings of all the cooling circuits are similar to form an integral cooling system. For ease of description, an embodiment of the present disclosure uses the first cooling circuit 1 for cooling the first heating component 100 (i.e., a small-capacity cooling system, such as a nacelle cooling system), the second cooling circuit 2 for cooling the second heating component 200 (i.e., a converter cooling system), the third cooling circuit 3 for cooling the third heating component 300 (i.e., a generator cooling system), and the fourth cooling circuit 4 for cooling the fourth heating component 400 (i.e., a transformer cooling system) as an example.

The cooling system provided by an embodiment of the present disclosure includes: the first cooling circuit 1 for cooling the first heating component 100, the second cooling circuit 2 for cooling the second heating component 200, and the third heating component 300 for cooling the third cooling circuit 3, the fourth cooling circuit 4 for cooling the fourth heating component 400, the pump station unit 5 and the heat dissipation unit 7. The first heating component 100 has the smallest heat generation amount, the third heating component 300 has the largest heat generation amount, and each of heat generation amount of the second heating component 200 and the fourth heating component 400 is between that of the first heating component 100 and that of the third heating component 300.

As the core power unit of the entire cooling system, the pump station unit 5 provides power for the entire cooling system. The pump station unit 5 includes a pump group 53, a water distributor 51 and a water collector 52. A main water supply pipe 54 is arranged between the pump group 53 and the water distributor 51, and a main water return pipe 55 is arranged between the pump group 53 and the water collector 52.

The pump group 53 provides cooling medium for the first cooling circuit 1, the second cooling circuit 2, the third cooling circuit 3 and the fourth cooling circuit 4 via the water distributor 51. The cooling medium may be a liquid medium, such as water, oil, or the like. The first cooling circuit 1 is directly communicated with the water collector 52, and the second cooling circuit 2, the third cooling circuit 3, and the fourth cooling circuit 4 are respectively communicated with the water collector 52 via the heat dissipation unit 7.

The pump station unit 5 is provided with the water distributor 51 on the main water supply pipe 54 and the water collector 52 on the main water return pipe 55 to ensure a stability of the water supply of the system. The cooling medium is provided to each heating component via the pump group 53 and a water supply line on the water distributor 51, and the water of the first cooling circuit 1, the second cooling circuit 2, the third cooling circuit 3, and the fourth cooling circuit 4 is returned via the water return line on the water collector 52.

In the cooling system provided by the embodiment of the present disclosure, the first cooling circuit 1, the second cooling circuit 2, the third cooling circuit 3 and the fourth cooling circuit 4 corresponding to respective heating components are integrated into one system, and as the core power unit of the entire cooling system, the pump station unit 5 provides power for the entire cooling system. As a cooling load undertaken by the first cooling circuit 1 is small, its inlet and outlet are respectively directly connected to the pump station unit 5 through a short circuit, which simplifies a line layout without causing a great impact on a rise of a temperature of the cooling medium in the entire system. Large losses appear in the second cooling circuit 2, the third cooling circuit 3, and the fourth cooling circuit 4. The temperature of the cooling medium pumped from the pump station unit 5 rises after passing through the above three cooling circuits, then enters the heat dissipation unit 7 via which the temperature of the cooling medium drops, and enters the pump station unit 5 again to form a closed-circuit cycle, simplifying a line configuration, reducing the number of heating components, and improving a utilization rate of the cooling capacity of the system.

Figure 2:
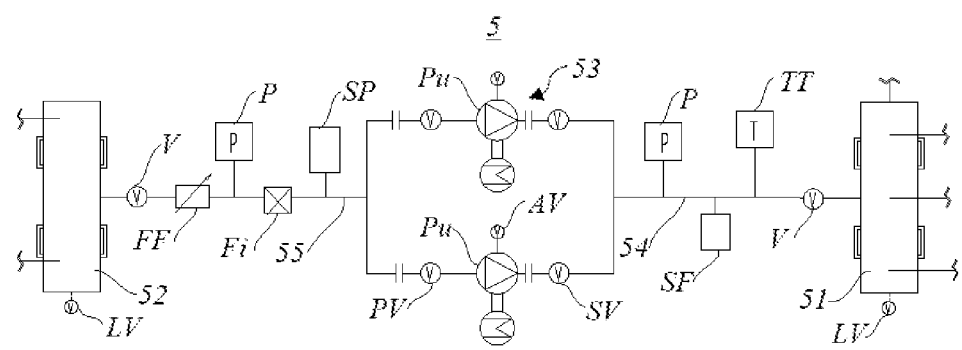
FIG. 2 is a schematic structural diagram of a pump station unit in the cooling system shown in FIG. 1.

FIG. 2 shows a specific structure of the pump station unit 5. The pump station unit 5 includes the pump group 53, various functional valves, various sensors, a pressure stabilizing device and a filter, so as to realize a normal, stable and maintainable operation of the entire cooling system.

The pump group 53 may include one pump body Pu or at least two pump bodies Pu arranged in parallel. When the pump group 53 includes at least two pump bodies Pu arranged in parallel, the at least two pump bodies Pu can be used for parallel operation, or in a form of partial operation and partial backup. According to a comprehensive consideration of a space layout size, system capacity, reliability, cost-effectiveness and other factors, an energy-saving and fault-tolerant operation can be realized. That is, after one pump body Pu fails, the remaining pump body Pu can still meet all or more than 75% of the performance of the system. At the same time, in order to further achieve the optimal energy efficiency of the system, the pump group 53 of each cooling subsystem S can adopt control methods such as fixed frequency operation, high and low speed operation, variable frequency operation, or fault-tolerant operation of at least two pump bodies, so as to meet a need of a cool load operation of the entire wind power generator set and improve the fault tolerance of the system and an effective energy saving strategy.

The pump body Pu is provided with an exhaust valve AV to exhaust gas during the operation of the system, thereby protecting a safe operation of the pump group 53. An outlet of the pump body Pu is provided with a check valve SV to protect the pump body Pu. An inlet of the pump body Pu is provided with a pump body regulating valve PV. When a leakage problem appears in any one of the pump bodies Pu, the corresponding pump body regulating valve PV is quickly closed. The corresponding pump body Pu is cut off via the check valve SV and the pump body regulating valve PV. If the pump body Pu is in a form of a non-mechanical seal, the setting of the pump body regulating valve PV can be omitted.

Optionally, the inlet of the pump set 53 is provided with a filter Fi to ensure a cleanliness of the system. In addition, the filter Fi is provided with a drainage function and can be used as a local drainage point for the pump group 53.

Optionally, the main water return pipe 55 is provided with the pressure stabilizing device SP, which can be used in a form of a high-level water tank or an expansion tank, to generate an alarm for the system when the pressure in the system fluctuations due to temperature changes to avoid a harm to the system. Optionally, the outlet of the pump group 53 is provided with a safety device SF to relieve pressure to achieve protection when the pressure in the system exceeds a certain value.

Optionally, the inlet and outlet of the pump group 53 are also provided with a main pressure monitoring device P. Optionally, the main pressure monitoring device P includes a pressure transmitter and a pressure display device. The main pressure transmitter is used for local and remote control of the operation of the system, and the main pressure display device is used for local injection and operation and maintenance observation.

Optionally, the main water supply pipe 54 and the main water return pipe 55 are respectively provided with a main valve V, and the water collector 52 and the water distributor 51 are respectively provided with a drain valve LV. Via the opening and closing of the main valve V, the water collector 52 and the water distributor 51 are cut out, thereby facilitating their replacement and maintenance.

Optionally, the inlet of the pump group 53 is provided with a main flow sensor FF, and the outlet of the pump group 53 is provided with a main temperature sensor TT. The main temperature sensor TT is used for taking a value of an inlet temperature of each cooling circuit. Combined with the temperature sensor provided on each of the cooling circuits and the cooling unit 7 and the flow sensor provided on each cooling branch, it is convenient to calculate the actual heat dissipation loss of each cooling circuit in a logic control process. Therefore, in combination with parameters such as ambient temperature, load of the set, flow rate of the system, etc., the entire internal logic relationship of each cooling circuit and the system is recorded, which is beneficial to the optimization of system control logic and the optimization of component selection.

The specific structure of each cooling circuit will be described in further detail below with reference to FIGS. 1 and 3 to 7.

Figure 3:
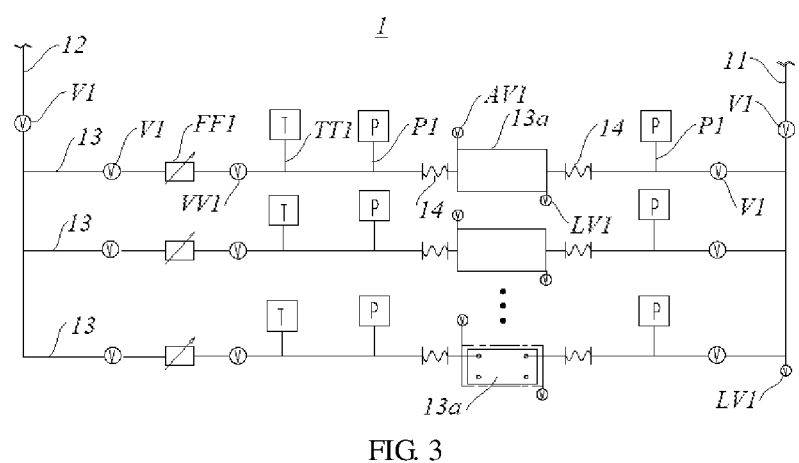
FIG. 3 is a schematic structural diagram of a first cooling circuit in the cooling system shown in FIG. 1.

FIG. 3 shows a specific structure of the first cooling circuit 1. The first cooling circuit 1 is a small-capacity cooling system for cooling the first heating component 100. The first heating component 100 includes at least one of a shaft system, a cable, a pitch, a nacelle, a nacelle cabinet, and a nacelle base. The first cooling circuit 1 includes a first fluid line, a plurality of first branch radiators 13a in parallel for cooling a plurality of first heating components 100, and also includes a variety of functional valves and a variety of sensors to realize a normal, stable and maintainable operation of the first cooling circuit 1.

The cooling medium flows into the first water supply pipe 11 via the water distributor 51 of the pump station unit 5, and is transported to a plurality of first branch heat exchangers 13a in parallel. After exchanging heat with respective first heating component 100 in each branch heat exchanger, the cooling medium converges to the first water return pipe 12, and then flows directly back to the pump station unit 5 via the water collector 52.

Specifically, the first cooling circuit 1 includes a first fluid line, the first water supply pipe 11 of the first fluid line is communicated with the water distributor 51, and the first water return pipe 12 of the first fluid line is communicated with the water collector 52. The first fluid line is provided with a plurality of first fluid branches 13 corresponding to the plurality of first heating components 100 one-to-one. For example, some of the first fluid branches 13 are used to cool the shaft system, some of the first fluid branches 13 is used for cooling the pitch, and some of the first fluid branches 13 are used for cooling cables and the like. An end of each of the plurality of first fluid branches 13 converges to the first water supply pipe 11, and the other end thereof converges to the first water return pipe 12. The first water supply pipe 11 is communicated with the water distributor 51, and the first water return pipe 12 is communicated with the water collector 52.

Further, each of the first fluid branches 13 is provided with a first branch radiator 13a, and a first branch regulating valve VV1, a first branch temperature sensor TT1 and a branch flow sensor FF1 is located downstream of each first fluid branch 13. Measured values of each of first branch temperature sensors TT1 and each of first branch flow sensors FF1 are monitored, according to a target temperature value of each first heating component 100, a flow rate of a fluid branch 13 is adjusted by controlling an opening degree of each first branch regulating valve VV1.

Each first fluid branch 13 is provided with the first branch regulating valve VV1, which can adjust the flow rate of each first fluid branch 13 according to a load demand of each heating component, thereby dynamically adjusting a configuration of a cooling capacity of each heating component according to a change of an environmental boundary to achieve an adjustment of cooling capacity in other heat dissipation components.

In order to reduce the number of lines, the lines from the water distributor 51 of the pump station unit 5 are branched by collecting the first water supply pipe 11 to the vicinity of each first branch radiator 13a, and similarly, collecting and directly connecting the first water return pipe 12 to the water collector 52 and into the pump station unit 5. Since each first branch radiator 13a of the first cooling circuit 1 bears a relatively small amount of loss. In order to simplify and shorten the line layout, the first water supply pipe 11 of the first cooling circuit 1 directly enters and exits the water collector 52, the main water return pipe 12 directly enters and exits the water distributor 51, avoiding too many other cooling circuits to the radiator and thereby effectively simplifying the line layout and optimizing the line arrangement.

Due to a continuous change of the ambient temperature, as well as a continuous load change of the set with a change of wind conditions, the first branch regulating valve VV1 on the first fluid branch 13 is dynamically adjusted according to different characteristics of respective first heating components 100 and by its temperature limit as the logical control object. The flow adjustment is used to provide sufficient cooling load for each first heating component and at the same time provide sufficient cooling load for other cooling circuits, or the load of the pump group 53 is adjusted to achieve energy saving of a system response.

Optionally, first flexible pipes 14 are respectively provided at the front and rear of the first branch radiator 13a to facilitate a connection between the line and the first branch radiator 13a and a vibration reduction of the equipment. The first branch temperature sensor TT1 is provided on the first fluid branch 13, and combined with the main temperature sensor TT and the first branch flow sensor FF1 on the pump station unit 5, the actual heat dissipation amount of each first fluid branch 13 can be obtained. Via data statistics and analysis, the logical relationship among environmental boundary, load of the set, opening of the regulating valve and other factors can be effectively obtained, which can effectively improve the optimization of each heat dissipation component and the logical control of the set.

Since corresponding components are arranged on each first fluid branch 13, in order to reduce the influence on the whole system, at least one of the inlet and the outlet of the first water supply pipe 11, the first water return pipe 12, and each first branch radiator 13a is provided with a first valve V1. By an opening or closing of the first valve V1, the sensors and components on the first fluid branch 13 can be replaced and maintained.

Optionally, the first fluid line and at least one of first branch radiators 13a are provided with first drain valves LV1. By opening and closing a first drain valve LV1, the corresponding first fluid branch 13 can be cut off and the liquid can be discharged at a local position.

According to different radiating forms and different radiators, the first branch radiator 13a provided on the first fluid branch 13 may be in the form of air-water heat exchange, water-oil heat exchange or other forms. The first branch radiator 13a is provided with a first drain valve LV1, which facilitates partial drainage of the first branch radiator 13a and the first fluid branch 13.

In order to prevent gas high collection at local points during a liquid injection process, optionally, each first branch radiator 13a is further provided with a first exhaust valve AV1 to facilitate local exhaust.

Optionally, a first pressure monitoring device P1 is respectively provided upstream and downstream of each first fluid branch 13. Optionally, the first pressure monitoring device P1 includes a pressure transmitter and a pressure display device for remotely and locally monitoring the pressure change of the system.

Figure 4:
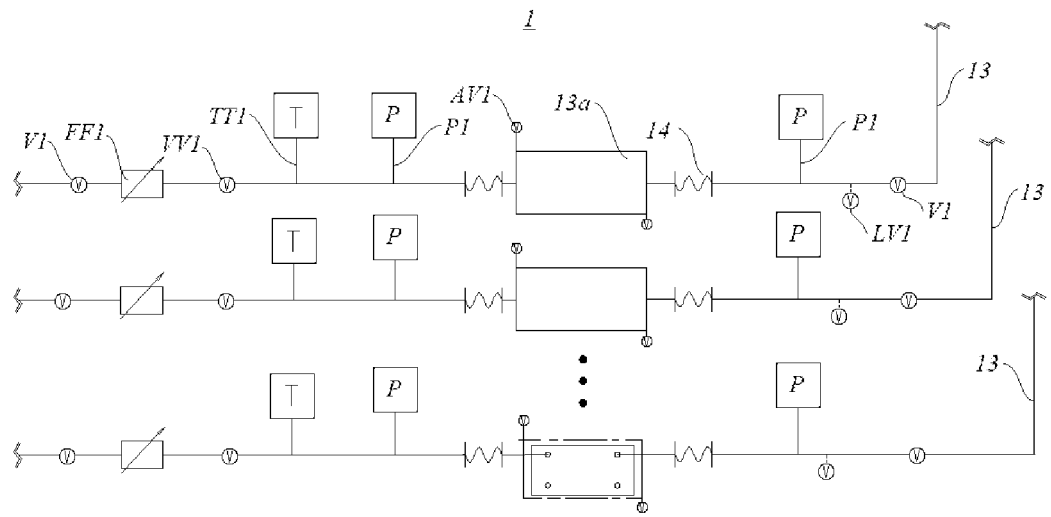
FIG. 4 is a schematic structural diagram of another first cooling circuit in the cooling system shown in FIG. 1.

FIG. 4 shows another specific structure of the first cooling circuit 1. The first cooling circuit 1 is similar in structure to the first cooling circuit 1 shown in FIG. 3, except that the cooling medium flows into each first fluid branch of the first cooling circuit 1 through the water distributor 51 of the pump station unit 5, and after passing through the first branch heat exchangers 13a, flows back to the pump station unit 5 via the water collector 52 through respective independent lines to realize a closed-circuit circulation.

Specifically, the first fluid line includes a plurality of first fluid branches 13 corresponding to the plurality of first heating components 100 one-to-one, an end of each first fluid branch 13 is communicated with the water distributor 51, and the other end of each first fluid branch 13 is communicated with the water collector 52.

In this embodiment, the water distributor 51 of the pump station unit 5 is drawn out in the form of a branch pipe, and enters the water collector 52 also in the form of a branch pipe. A first drain valve LV1 is provided on each first fluid branch 13, to meet a drainage of each first fluid branch 13.

Referring again to FIG. 1, the second cooling circuit 2 includes a second fluid line, and a second water supply pipe 21 of the second fluid line is communicated with the water distributor 51.

The third cooling circuit 3 includes a third fluid line, and the third water supply pipe 31 of the third fluid line is communicated with the water distributor 51.

The fourth cooling circuit 4 includes a fourth fluid line, and the fourth water supply pipe 41 of the fourth fluid line is communicated with the water distributor 51.

The second water return pipe 22 of the second fluid line, the third water return pipe 32 of the third fluid line, and the fourth water return pipe 42 of the fourth fluid line are respectively communicated with the water collector 52 via the heat dissipation unit 7.

Further, the cooling system provided in the embodiment of the present disclosure further includes a heat exchanger 6, a bypass 33 is provided on the third water supply pipe 31, and the second water supply pipe 21 and the bypass 33 are thermally coupled and isolated from each other via the heat exchanger 6.

Specifically, the bypass 33 is provided with a bypass regulating valve 33a, the heat exchanger 6 is configured to open the bypass regulating valve 33a when the temperature of the cooling medium of the second cooling circuit 2 is lower than a preset temperature, so that the cooling medium of the third cooling circuit 3 exchanges heat with the cooling medium of the second cooling circuit 2 via the bypass 33. Therefore, under extremely low temperature conditions, via the heat exchanger 6, the generator cooling system transfers a part of the heat load generated by the loss to the converter cooling system via the cooling medium of the bypass 33, which not only makes reasonable use of the waste heat of the generator, and meet the minimum operating temperature requirements of heating components, such as the converter cooling system.

Optionally, the heat exchanger 6 is a liquid-liquid two-way heat exchanger. The heat exchanger 6 includes a first heat conduction channel and a second heat conduction channel arranged at intervals. The first heat conduction channel includes a first inlet end 61a and a first outlet end 61b, and the second heat conduction channel includes a second inlet end 62a and a second outlet end 62b.

The second water supply pipe 21 includes a first section 211 and a second section 212, the first section 211 is connected to the first inlet end 61a at its downstream, and the second section 212 is connected to the first outlet end 61b at its upstream.

The water supply bypass pipe 331 of the bypass 33 is connected to the second inlet end 62a, and the water return bypass pipe 332 of the bypass 33 is connected to the second outlet end 62b.

Therefore, a total of four ports are provided on the heat exchanger 6, the bypass 33 of the third fluid line enters the heat exchanger 6 and then flows through the second heat conduction channel. The second fluid line enters the heat exchanger 6 and then flows through the first heat conduction channel. Each heat conduction channel is formed by a sealing structure. The cooling medium in the second fluid line and the cooling medium in the third fluid line conduct heat transfer in the heat exchanger 6 in a co-current or cross-flow manner, so as to realize the mutual transfer and balance of the heat of the two cooling circuits. The four ports can be arranged on the same side of the heat exchanger 6, or can be arranged on two sides of the heat exchanger 6.

Figure 5:
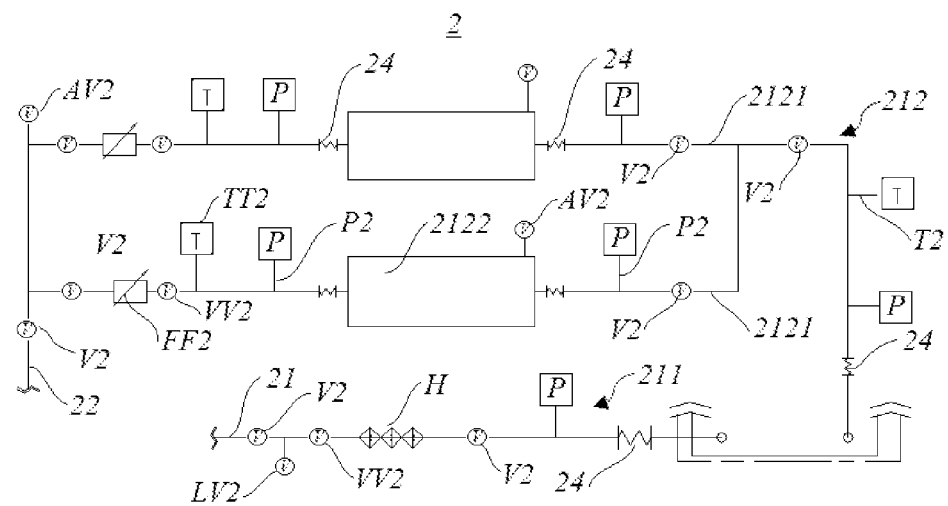
FIG. 5 is a schematic structural diagram of a second cooling circuit in the cooling system shown in FIG. 1.

FIG. 5 shows the specific structure of the second cooling circuit 2. The second cooling circuit 2 is a converter cooling system, including the second fluid line, a plurality of second branch radiators 2122 in parallel for cooling the second heating component 200, a heater H, and various function valves and various sensors, to realize the normal, stable and maintainable operation of the second cooling circuit 2.

Under the action of the pump station unit 5, the cooling medium flows into the second water supply pipe 21 via the water distributor 51, flows through the first heat conduction channel of the heat exchanger 6, is then transported to the plurality of second branch heat exchangers 2122 in parallel, and after conducting the heat exchange between respective branch heat exchangers with the second heating component 200, converges to the second water return pipe 22, then flows through the heat dissipation unit 7 and then flows back to the pump station unit 5 through the water collector 52 to realize a closed-circuit circulation.

Specifically, the second section 212 of the second water supply pipe 21 of the second cooling circuit 2 is provided with the plurality of second fluid branches 2121 corresponding to the plurality of second heating components 200 one-to-one. The second branch radiator 2122 is provided on each second fluid branch 2121. The second branch temperature sensor TT2 and the second branch flow sensor FF2 are arranged downstream of each second fluid branch 2121. Measured values of each second branch temperature sensor TT2 and each second branch flow sensor F22 are monitored, according to a target temperature value of each second heating component 200, the opening of each second branch regulating valve VV2 is controlled to adjust the flow rate of the second fluid branch 2121.

In addition, according to different heat dissipation components and different heat dissipation forms, a second branch regulating valve VV2 is also provided downstream of each second fluid branch 2121. A faulty second branch regulating valve VV2 is intelligently closed according to the fault-tolerant operation of the second fluid branch 2121, to reduce a requirement of system flow resistance and realizes the energy saving of the pump station unit 5.

Optionally, a heater H is provided on the first section 211 of the second water supply pipe 21, and when the temperature of the cooling medium of the second cooling circuit 2 is lower than the preset temperature and the third heating component 300 is not activated, the heater H is activated.

Since the second heating component 200, namely the converter, cannot be activated at extremely low temperature, it needs to be preheated by the cooling medium in the second cooling circuit 2. If the third heating component 300, i.e., the generator, is not activated, the converter can heat the cooling medium by starting the heater H, so as to meet the preheating requirement before the converter is activated. If the generator is activated during this period, the heater H is turned off and the bypass regulating valve 33a is opened. The waste heat generated by the generator can heat the cooling medium in the third cooling circuit 3 and enter the heat exchanger 6 through the bypass 33. The cooling medium at a low temperature of the second cooling circuit 2 exchanges heat with the cooling medium at a high temperature in the third cooling circuit 3 in the heat exchanger 6 until a preset temperature is reached at which the converter can be activated. When the temperature of the cooling medium of the second cooling circuit 2 reaches the preset temperature, the converter starts to operate, and the bypass regulating valve 33a is closed. By reusing the waste heat of the generator and activating the heater H as little as possible, the self-consumption power of the system can be saved and the energy consumption of the system can be reduced.

Optionally, a second middle main temperature sensor T2 is further provided upstream of the second section 212, and the opening/closing of the heater H and the opening of the bypass regulating valve 33a are controlled according to the measured value of the second middle main temperature sensor T2. By controlling the opening degree of the bypass regulating valve 33a, the flow rate of the cooling medium at a high temperature entering the bypass 33 is adjusted, thereby gradually heating the cooling medium in the second cooling circuit 2.

In addition, according to the fault tolerance requirement of the second cooling circuit 2, the plurality of second fluid branches 2121 are arranged on the second section 212 of the second water supply pipe 21. Second flexible pipes 24 are respectively arranged at the front and rear of the heat exchanger 6 to facilitate a line connection and vibration reduction.

Optionally, a second pressure monitoring device P2 downstream of the first section 211, upstream of the second section 212, and at least one of upstream and downstream of each second fluid branch 2121. Optionally, the second pressure monitoring device P2 includes a pressure transmitter and a pressure display device. The second pressure monitoring device P2 is used to locally and remotely monitor the resistance change and blockage replacement of the heat exchanger 6 on the second cooling circuit 2. The second branch radiators 2122 are respectively provided at the front and rear of each of the second pressure monitoring devices P2, to remotely and locally monitor a pressure change of the system.

Optionally, a second Valve V2 is provided on the second water supply pipe 21 and the second water return pipe 22, downstream of the heater H, upstream of the second section 212, and at least one of upstream and downstream of each second fluid branch 2121. Second valves V2 are respectively arranged on the second water supply pipe 21 and the second water return pipe 22, so that the sensors and components of the second fluid line can be replaced and maintained. According to maintenance and replacement requirements, after any two second valves V2 are closed, corresponding operations can be performed on the internal sensors, pipe fittings and sensors.

Optionally, the first section 211 is provided with a second drain valve LV2, so as to effectively realize local liquid discharge and reduce an impact of component replacement on the entire system.

Optionally, the second water return pipe 22 is further provided with a second exhaust valve AV2, which can effectively realize an effective exhaust of the system and branch parts during a liquid injection process of the system.

Figure 6:
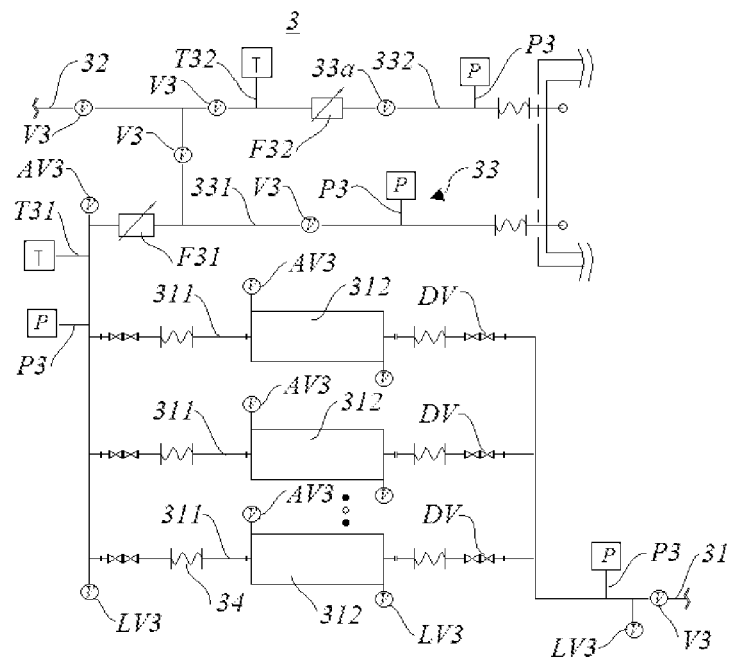
FIG. 6 is a schematic structural diagram of a third cooling circuit in the cooling system shown in FIG. 1.

FIG. 6 shows the specific structure of the third cooling circuit 3. The third cooling circuit 3 is a generator cooling system, including a third fluid line, a plurality of third branch radiators 312 in parallel for cooling the third heating component 300, and also various functional valves and various sensors, to realize the normal, stable and maintainable operation of the third cooling circuit 3.

Under the action of the pump station unit 5, the cooling medium flows into the third water supply pipe 31 via the water distributor 51, is transported to the plurality of third branch heat exchangers 312 in parallel, after conducting the heat exchange between respective branch heat exchangers and the third heating component 300, enters the third water return pipe 32, and then flows through the heat dissipation unit 7 and then flows back to the pump station unit 5 via the water collector 52 to realize a closed-circuit circulation.

Specifically, the third fluid line is provided with a plurality of third fluid branches 311 corresponding to the third heating component 300, the bypass 33 is arranged downstream of the plurality of third fluid branches 311, and each third fluid branch 311A is provided with a third branch radiator 312.

The third fluid line is also provided with a third temperature sensor T31 and a third flow sensor F31 located downstream of the third water supply pipe 31, and a third bypass temperature sensor T32 and a third flow sensor F32 are provided on the bypass water return pipe 332 of the bypass 33.

The cooling medium enters the third cooling circuit 3 along the third water supply pipe 31 via the water distributor 51 of the pump station unit 5, and is divided into a plurality of third fluid branches 311 from the third water supply pipe 31 which enter respective third third branch radiators 312 uniformly. Each third branch radiator 312 may be a heat sink module or an air-water heat exchanger. When the bypass regulating valve 33a is opened, each cooling medium after heat exchange will converge to the third water return pipe 32 via the third fluid branch 311, a part of the cooling medium will enter the second heat conduction channel of the heat exchanger 6 along the water supply bypass pipe 331 of the bypass 33, after conducting the heat exchange with the second cooling circuit 2, finally converges to the third water return pipe 32 with a main path of the third water return pipe 32, and then flows through the heat dissipation unit 7 and then flows back to pump station unit 5 via the water collector 52.

The opening of the bypass regulating valve 33a is controlled to adjust the flow rate of the cooling medium entering the heat exchanger 6. According to a temperature difference between the third temperature sensor T31 and the third bypass temperature sensor T32 and the flow rate of the third bypass flow sensor F32, the waste heat transferred from the bypass 33 to the second cooling circuit 2 is obtained. Combined with the main temperature sensor TT and the third flow sensor F31 in the pump station unit 5, through data statistics and analysis, the logical relationship between the heat dissipation of the third cooling circuit 3 and an environmental boundary, load of the set, system flow rate, etc. can be known.

Optionally, third pressure monitoring devices P3 are respectively provided upstream and downstream of the third water supply pipe 31, at least one of the water supply bypass pipe 331 and the water return bypass pipe 332 of the bypass 33. Optionally, each of the third pressure monitoring devices P3 includes a pressure transmitter and a pressure display device. Third pressure monitoring devices P3 are respectively provided upstream and downstream of the third water supply pipe 31, which can remotely and locally monitor the pressure values before and after passing through the third branch radiator 312.

Optionally, third valves V3 are provided upstream and downstream of the third water supply pipe 31 of the third fluid line, at least one of the water supply bypass pipe 331, the water return bypass pipe 332 and a third water return pipe 32 of the bypass 33. Optionally, third drain valves LV3 are provided upstream and downstream of the third water supply pipe 31 and at least one of respective third branch radiators 312. Optionally, at least one of the third branch radiators 312 and the third water return pipe 32 is provided with a third exhaust valve AV3.

Third liquid drain valves LV3 are respectively provided upstream and downstream of the third water supply pipe 31 with, and the third cooling circuit 3 is drained by an opening and closing of the third valves V3. At the same time, a third exhaust valve AV3 is provided on the third water return pipe 32 to facilitate the effective exhaust of the system during liquid injection and operation.

The third branch radiators 312 are respectively provided with the third drain valves LV3 to achieve effective liquid discharge and exhaust of the third branch radiators 312.

Optionally, two-way shut-off valves DV are respectively provided upstream and downstream of each third fluid branch 311, so as to facilitate a disassembly and replacement of the third branch radiator 312 under a liquid condition. Meanwhile, third flexible pipes 34 are respectively provided on the third fluid branch 311 and the third water return pipe 32 to facilitate an installation of the third branch radiator 312.

In addition, the heat exchanger 6 is also provided with the third pressure monitoring device P3 on the side where the third cooling circuit 3 is located. Third flexible pipes 34 are also provided at both ends of the line on this side. Third valves V3 are provided at the front and rear of the heat exchanger 6 respectively, which can remotely and locally monitor the pressure values before and after the heat exchanger 6. At the same time, the third bypass flow sensor F32 and the third bypass temperature sensor T32 are arranged on the water return bypass pipe 332, and combined with the third temperature sensor T31, the heat exchange amount passing through the heat exchanger 6 can be known, so that the system can be managed in a refined manner to facilitate optimization and update of the system.

Figure 7:
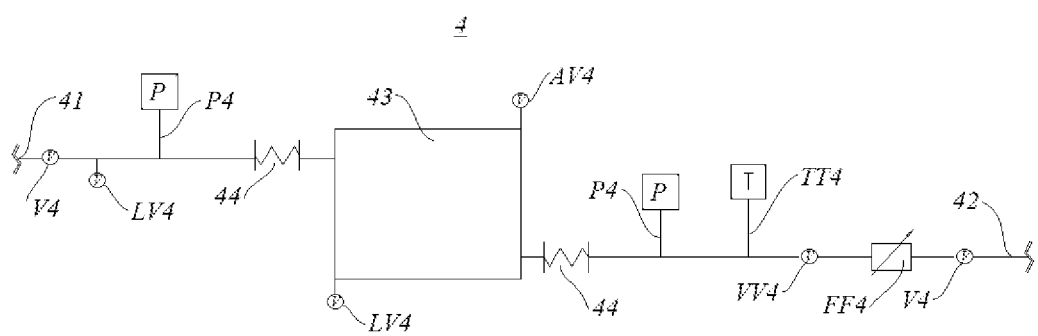
FIG. 7 is a schematic structural diagram of a fourth cooling circuit in the cooling system shown in FIG. 1.

FIG. 7 shows the specific structure of the fourth cooling circuit 4. The fourth cooling circuit 4 is a transformer cooling system, and includes a fourth fluid line, a fourth radiator 43 for cooling the fourth heating component 400, and also various functional valves and various sensors to realize the normal, stable and maintainable operation of the fourth cooling circuit 4.

Under the action of the pump station unit 5, the cooling medium flows into the fourth water supply pipe 41 via the water distributor 51, and is transported to the fourth heat exchanger 43, after conducting the heat exchange between the fourth heat exchanger 43 and the fourth heating component 400, enters the fourth water return pipe 42 and flows through the heat dissipation unit 7 and then flow back to the pump station unit 5 via the water collector 52 to realize a closed-circuit circulation. The fourth radiator 43 may be an air-water heat exchanger or an oil-water heat exchanger.

Specifically, the fourth fluid line is provided with a fourth radiator 43, and the fourth water return pipe 42 is provided with a fourth regulating valve VV4, a fourth temperature sensor TT4 and a fourth flow sensor FF4.

The measured values of the fourth temperature sensor TT4 and the fourth flow sensor FF4 are monitored, and the opening of the fourth regulating valve VV4 is controlled to adjust the flow rate of the fourth fluid line according to the target temperature value of the fourth heating component 400. The fourth temperature sensor TT4 and the fourth flow sensor FF4 provided on the fourth water return pipe 42, combined with the main temperature sensor TT in the pumping station unit 5 and by data statistics and analysis, is the same as that of the fourth cooling circuit 4 a logical relationship between the heat dissipation of the fourth cooling circuit 4 and an environmental boundary, load of the set, flow rate of the system, etc. can be known.

Optionally, the fourth water supply pipe 41 and the fourth water return pipe 42 are respectively provided with fourth valves V4. Optionally, the fourth water supply pipe 41 and the fourth radiator 43 are respectively provided with a fourth drain valve LV4. Optionally, the fourth radiator 43 is further provided with a fourth exhaust valve AV4. Optionally, fourth pressure monitoring devices P4 are respectively provided on the fourth water supply pipe 41 and the fourth water return pipe 42.

The fourth exhaust valve AV4 and the fourth drain valve LV4 provided on the fourth radiator 43 are convenient for exhausting and injecting-exhausting the fourth fluid line. The fourth flexible pipes 44 are respectively disposed at the front and rear of the fourth radiator 43 to facilitate the installation of the fourth radiator 43. Similarly, the fourth pressure monitoring devices P4 are respectively provided at the front and rear of the fourth radiator 43, so that the pressure of the fourth cooling circuit 4 can be effectively monitored locally and remotely. The fourth water supply pipe 41 is provided with a fourth drain valve LV4. By closing the fourth valves V4 on the fourth water supply pipe 41 and the fourth water return pipe 42, the equipment, sensors, etc. on the fourth cooling circuit 4 can be replaced and maintained.

Figure 8:
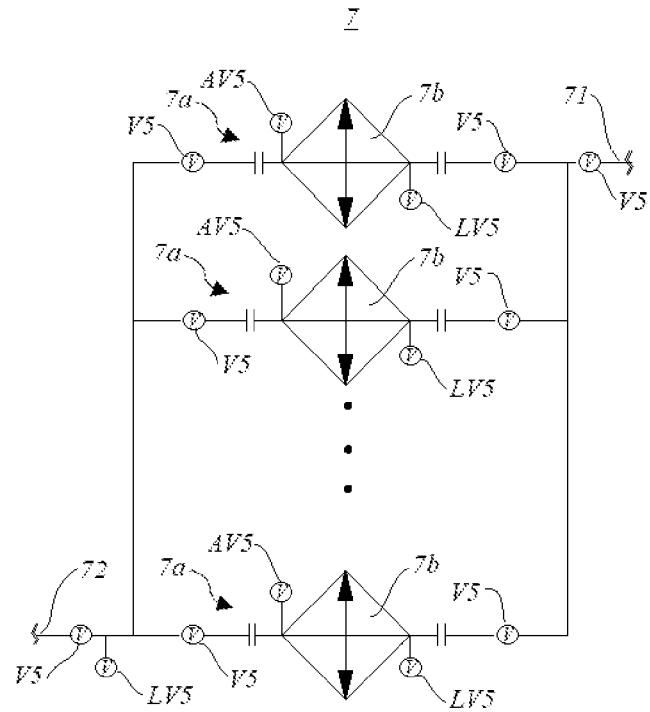
FIG. 8 is a schematic structural diagram of a heat dissipation unit in the cooling system shown in FIG. 1.

Please refer to FIG. 1 and FIG. 8 together. An embodiment of the present disclosure provides the heat dissipation unit 7, which includes a plurality of heat dissipation branches 7a, and each heat dissipation branch 7a is provided with a fifth radiator 7b. The second water return pipe 22 of the second cooling circuit 2, the third water return pipe 32 of the third cooling circuit 3, and the fourth water return pipe 42 of the fourth cooling circuit 4 are respectively communicated with a fifth water supply pipe 71 of the heat dissipation unit 7. The fifth water return pipe 72 of the heat dissipation unit 7 is communicated with the water collector 52.

The second cooling circuit 2, the third cooling circuit 3, and the fourth cooling circuit 4 in the cooling system provided in the embodiment of the present disclosure converge to the heat dissipation unit 7, and the heat dissipation unit 7 enters the pump station unit 5 in the form of a converging pipe. In order to reduce the number of pipes entering the heat dissipation unit 7 from the second cooling circuit 2, the third cooling circuit 3 and the fourth cooling circuit 4, when the overall loss of the system is moderate and the size of the pipes and processing meet process requirements, three pipes converge to the fifth water supply pipe 71, and the cooling medium is cooled by each fifth radiator 7b. Similarly, the first cooling circuit 1 can also enter and exit the pump station unit 5 in a similar converging form as shown in FIG. 3, thereby reducing the number of arrangements of the entire pipes on the wind power generator set.

Optionally, a fifth valve V5 is provided with the fifth water supply pipe 71 and the fifth water return pipe 72, and at least one of upstream and downstream of each heat dissipation branch 7a. Optionally, the fifth water supply pipe 71 and at least one of the fifth radiators 7b are respectively provided with fifth drain valves LV5. Optionally, each fifth radiator 7b is further provided with a fifth exhaust valve AV5.

The fifth radiator 7b is provided with a fifth drain valve LV5 and a fifth exhaust valve AV5, and by closing the fifth valve V5 on the fifth water supply pipe 71 and the fifth return pipe 72, the replacement of the fifth radiator 7b is realized, and at the same time, it is convenient for local drainage and cutting out with other components. By closing the fifth valves V5 on the fifth water supply pipe 71 and the fifth water return pipe 72, the heat dissipation unit 7 can be drained through the fifth drain valve LV5. All heat dissipation branches 7a finally converge to the fifth water return pipe 72, and enter the pump station unit 5 via the main water return pipe 55, to form a closed-circuit circulation of the entire cooling system.

Figure 9:
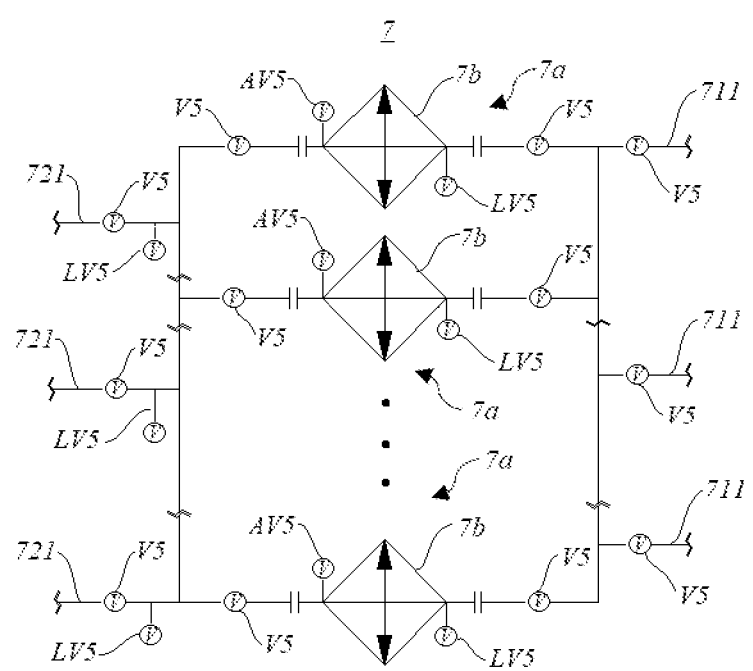
FIG. 9 is a schematic structural diagram of another heat dissipation unit in the cooling system shown in FIG. 1.

Referring to FIG. 9, the embodiment of the present disclosure also provides another heat dissipation unit 7 similar to the heat dissipation unit 7 shown in FIG. 8. The difference is that when the overall loss of the system is too high and the size and processing of the line cannot meet the requirements, the second cooling circuit 2, the third cooling circuit 3, and the fourth cooling circuit 4 enter the heat dissipation unit 7 as three-way lines. The three-way lines respectively enter the fifth radiator 7b through their respective fifth water supply branch pipes 711, and into the pump station unit 5 through their respective fifth water return branch pipes 721.

Specifically, the heat dissipation unit 7 includes the plurality of heat dissipation branches 7a, and the fifth radiator 7b is disposed between the fifth water supply branch pipe 711 and the fifth water return branch pipe 721 of each heat dissipation branch 7a.

The second water return pipe 22 of the second cooling circuit 2, the third water return pipe 32 of the third cooling circuit 3, and the fourth water return pipe 42 of the fourth cooling circuit 4 are respectively communicated to the fifth water supply branch pipe 711 of the heat dissipation branch 7a corresponding to them. The fifth water return branch pipes 721 of each heat dissipation branch 7a are communicated with the water collector 52 respectively.

Optionally, fifth valves V5 are provided respectively on each fifth water supply branch pipe 711 and each fifth water return branch pipe 721, and at least one of an inlet and outlet of each fifth radiator 7b. Optionally, at least one of the fifth water supply branch pipe 711 and the fifth radiator 7b is provided with a fifth drain valve LV5. Optionally, each fifth radiator 7b is further provided with a fifth exhaust valve AV5, respectively. Through an opening and closing of the fifth drain valve LV5 provided on the fifth water supply branch pipe 711 and the fifth water return branch pipe 721 of each heat dissipation branch 7a, the liquid discharge of each heat dissipation branch 7a is effectively realized.

Figure 10:
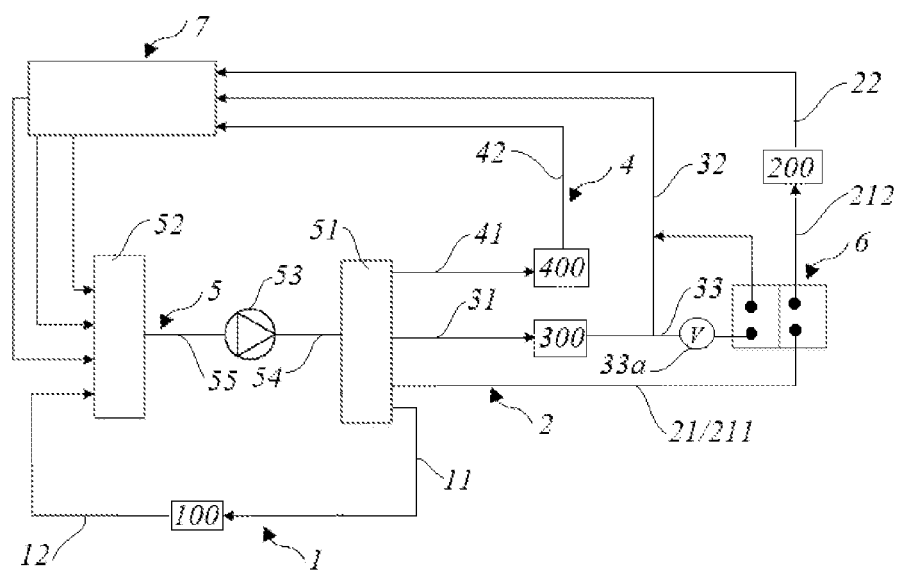
FIG. 10 is a simplified schematic structural diagram of another cooling system for a wind power generator set provided by an embodiment of the present disclosure.

Referring to FIG. 10, the embodiment of the present disclosure also provides a simplified schematic structural diagram of another cooling system of a wind power generator set, which is similar to the working principle of that of FIG. 1, except that the cooling unit 7 shown in FIG. 9 and the first cooling circuit 1 shown in FIG. 4 are adopted. That is, each first fluid branch 13 and the heat dissipation unit 7 in the first cooling circuit 1 respectively enter the pump station unit 5 through lines independent of each other, the second cooling circuit 2, the third cooling circuit 3 and the fourth cooling circuit 4 also enter the heat dissipation unit 7 through pipelines independent of each other. When the cooling capacity of the wind power generator set reaches a certain level, the cooling system shown in FIG. 10 can be used in order to facilitate the direction, layout and manufacturing process of the lines.

In the cooling system provided by an embodiment of the present disclosure, the first cooling circuit 1, the second cooling circuit 2, the third cooling circuit 3 and the fourth cooling circuit 4 corresponding to the heating components are integrated in a system in a form of independent lines respectively. After the loss of each heating component is exchanged with the cooling circuit, a direct circuit is set and a circulatory setting into the heat dissipation unit 7 is performed, which further simplifies a line configuration, reduces the number of heating components, and improves the utilization of the cooling capacity of the system.

The centralized cooling system provided by the embodiment of the present disclosure can effectively reduce the number of rotating components (such as pump sets) of the system, thereby improving the reliability of the system and reducing the failure rate. By optimizing the number of rotating components, the energy consumption of the cooling system during the operating time can be effectively reduced to improve the energy efficiency ratio of the entire cooling system. And by the fault-tolerant design of rotating components, while a reasonable distribution of cooling capacity is maintained, the fault tolerance and reliability of the entire cooling system are achieved.

The centralized cooling system provided by the embodiment of the present disclosure can effectively perform loss statistics and set the heat transfer direction during the operation of the set, and at the same time, combined with the ambient temperature, more reasonable components can be selected to provide sufficient statistical basis for subsequent evaluation.

The centralized cooling system provided by the embodiment of the present disclosure can dynamically adjust the cooling capacity configuration of a component with a small-capacity heating amount to reduce the complexity of line layout; and can fully utilize the waste heat resources of a heating component with a large-capacity heating amount to achieve a reasonable allocation of cooling and heating demand of the system.

In addition, the wind power generator set provided by the embodiment of the present disclosure adopts the aforementioned cooling system, which can effectively count the system loss and the heat transfer direction of the generator set during the operation, and combined with the ambient temperature to explore a more reasonable component selection, so as to provide sufficient statistical basis for subsequent evaluation of the reliability of wind power generator set.

In addition, the cooling system according to the above-described exemplary embodiment can be applied to various electrical equipments requiring a heat dissipation, such as but not limited to wind power generator set.

Those skilled in the art should understand that the above-mentioned embodiments are all illustrative and not restrictive. Different technical features appearing in different embodiments can be combined to achieve beneficial effects. Those skilled in the art should be able to understand and implement other variant embodiments of the disclosed embodiments on the basis of studying the drawings, the description and the claims. In the claims, the term "comprising" does not exclude other means or steps; an item is intended to include one/a or more/kinds of items when not modified by a quantifier, and may be interchanged with "one/a or more/kinds of items"; terms "first", "second" are used to designate names and not to indicate any particular order. Any reference signs in the claims should not be construed as limiting the protection scope. The functions of the multiple parts appearing in the claims can be realized by a single hardware or software module. The appearance of certain technical features in different dependent claims does not mean that these technical features cannot be combined to achieve beneficial effects.

What is claimed is:

1. A cooling system, comprising: a first cooling circuit for cooling a first heat source, a second cooling circuit for cooling a second heat source, a third cooling circuit for cooling a third heat source, a fourth cooling circuit for cooling a fourth heat source, a pump station unit and a heat dissipation unit;
   wherein the pump station unit comprises a pump group, a water distributor and a water collector, a main water supply pipe is arranged between the pump group and the water distributor, and a main water return pipe is arranged between the pump group and the water collector;
   the pump group provides a cooling medium for the first cooling circuit, the second cooling circuit, the third cooling circuit and the fourth cooling circuit via the water distributor;
   the first cooling circuit is directly communicated with the water distributor and the water collector, and the second cooling circuit, the third cooling circuit, and the fourth cooling circuit are respectively connected to the water collector via the heat dissipation unit;
   wherein the cooling system further comprises a heat exchanger via which the second cooling circuit and the third cooling circuit are thermally coupled with each other;
   wherein the third cooling circuit comprises a bypass; when a temperature of the second heat source is lower than a preset temperature, the cooling medium flows into the heat exchanger via the bypass of the third cooling circuit, to exchange heat with the cooling medium flowing into the second cooling circuit;
   wherein the heat exchanger comprises a first heat conduction channel and a second heat conduction channel spaced apart from each other; the first heat conduction channel comprises a first inlet end and a first outlet end, and the second heat conduction channel comprises a second inlet end and a second outlet end; a second water supply pipe of the second cooling circuit comprises a first section and a second section, the first section is connected to the first inlet end at its downstream, and the second section is connected to the first outlet end at its upstream; a water supply bypass pipe of the bypass is connected to the second inlet end, and a water return bypass pipe of the bypass is connected to the second outlet end.

2. The cooling system according to claim 1, wherein the first heat source has the smallest heat generation amount, the third heat source has the largest heat generation amount, and each of the second heat source and the fourth heat source has a heat generation amount between the heat generation amount of the first heat source and the heat generation amount of the third heat source.

3. The cooling system according to claim 1, wherein the pump group comprises one pump body or at least two pump bodies arranged in parallel;
   an inlet of the pump group is provided with a filter and a pressure stabilizing tank, and an outlet of the pump group is provided with a safety valve.

4. The cooling system according to claim 1, wherein an inlet of the pump group is provided with a main flow sensor, and an outlet of the pump group is provided with a main temperature sensor; each of the inlet and the outlet of the pump group is further provided with a main pressure monitor.

5. The cooling system according to claim 1, wherein the first cooling circuit comprises a first fluid line, a first water supply pipe of the first fluid line is communicated with the water distributor, and a first water return pipe of the first fluid line is communicated with the water collector;
   the first fluid line is provided with a plurality of first fluid branches corresponding to a plurality of the first heat sources one-to-one, an end of each of some first fluid branches converges to the first water supply pipe, the other end thereof converges to the first water return pipe; the first water supply pipe is communicated with the water distributor, and the first water return pipe is communicated with the water collector;
   or, the first fluid line comprises a plurality of first fluid branches corresponding to the plurality of the first heat sources one-to-one, an end of each of the first fluid branches is communicated with the water distributor, and the other end of each of the first fluid branches is communicated with the water collector.

6. The cooling system according to claim 5, wherein each of the first fluid branches is provided with a first branch radiator, and a first branch regulating valve, a first branch temperature sensor and a first branch flow sensor located downstream of each of the first fluid branches;
measured values of each of first branch temperature sensors and each of first branch flow sensors are monitored, and according to a target temperature value of each of the first heat sources, an opening of each of the first branch regulating valves is controlled to adjust a flow rate of each of the first fluid branches.

7. The cooling system according to claim 5, wherein a first pressure monitor is provided each of upstream and downstream of each of the first fluid branches.

8. The cooling system according to claim 1, wherein the second cooling circuit comprises a second fluid line, and the second water supply pipe of the second fluid line is communicated with the water distributor;
the third cooling circuit comprises a third fluid line, and a third water supply pipe of the third fluid line is communicated with the water distributor;
the fourth cooling circuit comprises a fourth fluid line, and a fourth water supply pipe of the fourth fluid line is communicated with the water distributor;
a second water return pipe of the second fluid line, a third water return pipe of the third fluid line, and a fourth water return pipe of the fourth fluid line are communicated with the water collector via the heat dissipation unit, respectively.

9. The cooling system according to claim 8, wherein the second section of the second water supply pipe is provided with a plurality of second fluid branches corresponding to a plurality of the second heat sources one-to-one, and each of the second fluid branches is provided with a second branch radiator, and a second branch regulating valve, a second branch temperature sensor and a second branch flow sensor are arranged downstream of each of the second fluid branches;
measured values of each of second branch temperature sensors and each of second branch flow sensors are monitored, and according to a target temperature value of each of the second heat sources, an opening of each of the second branch regulating valves is controlled to adjust a flow rate of each of the second fluid branches.

10. The cooling system according to claim 8, wherein a heater is provided on the first section of the second water supply pipe, and when a temperature of the cooling medium of the second cooling circuit is lower than a preset temperature and when the third heat source is not activated, the heater is activated.

11. The cooling system according to claim 10, wherein a second middle main temperature sensor is further provided upstream of the second section, and the heater is controlled to be open or closed and the opening of the bypass regulating valve is controlled according to a measured value of the second middle main temperature sensor.

12. The cooling system of claim 8, wherein a second pressure monitor is provided downstream of the first section, upstream of the second section, and at least one of upstream and downstream of each of the second fluid branches.

13. The cooling system according to claim 8, wherein the third fluid line is provided with a plurality of third fluid branches corresponding to the third heat sources, the bypass is arranged downstream of the plurality of third fluid branches, and each of the third fluid branches is provided with a third branch radiator;
the third fluid line is also provided with a third temperature sensor and a third flow sensor downstream of the third water supply pipe, and the water return bypass pipe of the bypass is provided with a third bypass temperature sensor and a third bypass flow sensor;
according to a temperature difference between the third temperature sensor and the third bypass temperature sensor and a flow rate of the third bypass flow sensor, a waste heat transferred from the bypass to the second cooling circuit is obtained.

14. The cooling system according to claim 13, wherein a third pressure monitor is provided upstream and downstream of the third water supply pipe, at least one of the water supply bypass pipe and the water return bypass pipe of the bypass.

15. The cooling system according to claim 13, wherein two-way shut-off valves are provided upstream and downstream of each of the third fluid branches, respectively.

16. The cooling system according to claim 8, wherein the fourth fluid line is provided with a fourth radiator, and a fourth regulating valve, a fourth temperature sensor and a fourth flow sensor are provided on the fourth water return pipe;
measured values of the fourth temperature sensor and the fourth flow sensors are monitored, and according to a target temperature value of the fourth heat source, an opening of the fourth regulating valve is controlled to adjust a flow rate of the fourth fluid line.

17. The cooling system according to claim 8, wherein a fourth pressure monitor is provided on each of the fourth water supply pipe and the fourth water return pipe.

18. The cooling system according to claim 8, wherein the heat dissipation unit comprises a plurality of heat dissipation branches, and each of the heat dissipation branches is provided with a fifth radiator;
the second water return pipe of the second cooling circuit, the third water return pipe of the third cooling circuit, and the fourth water return pipe of the fourth cooling circuit are respectively communicated with a fifth water supply pipe of the heat dissipation unit, and the fifth water return pipe of the heat dissipation unit is communicated with the water collector.

19. The cooling system according to claim 8, wherein the heat dissipation unit comprises a plurality of heat dissipation branches, and a fifth radiator is provided between a fifth water supply branch pipe and a fifth water return branch pipe of each heat dissipation branch;
the second water return pipe of the second cooling circuit, the third water return pipe of the third cooling circuit, and the fourth water return pipe of the fourth cooling circuit are respectively communicated with fifth water supply branch pipes of the heat dissipation branch, and the fifth water return branch pipe of each of the heat dissipation branches is communicated with the water collector.

20. A wind power generator set, comprising:
a first heat source, comprising at least one of a shaft system, a cable, a nacelle, a pitch mechanism, a nacelle cabinet, and a nacelle base;
a second heat source, comprising a converter;
a third heat source, comprising a generator;
a fourth heat source, comprising a transformer; and
the cooling system according to claim 1.

* * * * *